United States Patent Office 3,364,219
Patented Jan. 16, 1968

3,364,219
PROCESS OF OXIDATION OF PRIMARY AND SECONDARY ALCOHOLS TO CORRESPONDING CARBONYL DERIVATIVES
Jay Donald Albright and Leon Goldman, Nanuet, N.Y., assignors to American Cyanamid Company, Stamford, Conn., a corporation of Maine
No Drawing. Filed Sept. 1, 1965, Ser. No. 484,462
20 Claims. (Cl. 260—285)

This invention relates to a novel process for the oxidation of chemical compounds and, more particularly, to an improved method for the oxidation of primary and secondary alcohols to the corresponding carbonyl compounds.

While various methods are known for effecting the oxidation of chemical compounds, they suffer from the serious disadvantage in that they very often cause undesirable side reactions. For example, in oxidizing primary and secondary alcohols to the corresponding carbonyl compounds, the oxidizing agents will often attack unsaturated bonds or oxidize the compounds beyond the desired stage. In many instances, the use of known methods for oxidizing alcohols to the corresponding carbonyl compounds are unsuccessful or proceed in poor yields. For many alkaloidal materials the only successful oxidative procedure heretofore has been the Oppenauer oxidation.

In accordance with our invention, we have found that a mixture of a dialkyl sulfoxide and a carboxylic acid anhydride or a phosphoric anhydride is an effective reagent for the oxidation of primary and secondary alcohols. Suitable dialkyl sulfoxides which may be employed in the novel process of the present invention are those wherein the alkyl groups are those having up to about 4 carbon atoms such as, for example, diethyl sulfoxide, dipropyl sulfoxide, dibutyl sulfoxide, ethylbutyl sulfoxide, and the like. The term "dialkyl sulfoxide" also includes cyclic alkylene sulfoxides such as, for example, tetramethylene sulfoxide, pentamethylene sulfoxide, hexamethylene sulfoxide, and the like. Suitable carboxylic acid anhydrides contemplated by the present invention are those of sufficient reactivity to react with the dialkyl sulfoxide. These include, for example, acetic anhydride, propionic anhydride, butyric anhydride, benzoic anhydride, phenylacetic anhydride, and the like. Suitable phosphoric anhydrides contemplated by the present invention are phosphorous trioxide ($P_2O_3$), phosphorous tetroxide ($P_2O_4$), phosphorous pentoxide ($P_2O_5$), and polyphosphoric acid which is phosphorous pentoxide dissolved in phosphoric acid.

This method of oxidizing alcohols to the corresponding carbonyl compounds is particularly mild and is generally applicable to all primary and secondary alcohols. The mixture of a dialkyl sulfoxide and a carboxylic acid anhydride or a phosphoric anhydride are particularly useful oxidizing agents for effecting the oxidation of alcohols having at least one hydrogen atom attached to the carbon atom bearing the hydroxyl substituent, i.e., primary and secondary alcohols, to the corresponding carbonyl compounds. Thus, primary alcohols are oxidized to aldehydes and secondary alcohols are converted to ketones.

This method of oxidizing alcohols to the corresponding carbonyl compounds is particularly mild and is generally applicable to all primary and secondary alcohols. Examples of such alcohols which may be employed are aliphatic alcohols such as alkanols, alkenols, alkynols; aralkyl alcohols; aralkenyl alcohols; aralknyl alcohols; polyhydric alkanols, polyhydric alkenols and polyhydric alkynols; alicyclic alcohols such as cycloalkyl, cycloalkenyl, cycloalkynyl, steroid, terpene and polyterpene; alicyclic alkyl alcohols; alicyclic alkenyl alcohols; alicyclic alkynyl alcohols; heterocyclic alcohols; heterocyclic alkyl alcohols; heterocyclic alkenyl alcohols; heterocyclic alkynyl alcohols; and the like.

The primary and secondary alcohols which may be oxidized by the methods of the present invention can be unsubstituted alcohols or alcohols containing substituents such as lower alkoxycarbonyl, carbonyl lower alkoxy, sulfonic acid, nitro, halo, amino, lower dialkylamino groups, and the like.

Specific examples of such alcohols that might be mentioned are β-phenylethanol, cyclobutanol, cyclopentanol, cyclohexanol, cyclooctanol, menthol, p-nitrobenzyl alcohol, benzyl alcohol, cyclohexylethanol, testosterone, hydrocortisone 21-acetate, 11β-hydroxyprogesterone and 11α-hydroxyprogesterone, cholestanol, corticosterone 21-acetate, coprostanol, epicoprostanol, ergosterol, epiandrosterone, androsterone; sapogenins such as hecogenin, tigogenin and samogenin; bile acids such as lithocholic acid, cholic acid, cholanic acid, allocholanic acid and bufocholanic acid; periplogenin, digitoxigenin, strophanthidin, bufotalin and sarmentogenin.

The process of this invention is particularly useful in oxidizing alkaloids containing the sensitive indole moiety. Thus, alkaloids such as yohimbine, β-yohimbine, methylreserpate, α-yohimbine, pseudoyohimbine, ajmaline, tetraphyllicine, yohimbyl alcohol, apoyohimbyl alcohol, 16α-methylyohimban-17α-ol, sarpogine, lochnerine, and the like, can be oxidized with a mixture of a dialkyl sulfoxide and an anhydride to produce the corresponding carbonyl compounds. In addition, other nitrogen-containing compounds with hydroxyl groups such as scopolamine, atropine, galanthamine, 2′,3′-o-isopropylidine-adenosine, 2′,3′-o-isopropylideneuridine, α-dihydrocoranine, coranine, and the like can be oxidized by the process of this invention.

The reaction is conveniently carried out by dissolving the compound to be oxidized in the dialkyl sulfoxide and adding 1 to 20 mole excess of an acid anhydride. The reaction mixture is then allowed to stand at 0° C. to 100° C. for sufficient time to effect the desired oxidation. Preferably, the reaction mixture is allowed to stand at 20–30° C., protected from moisture, for sufficient time to insure completion of the oxidation. The reaction time is not critical, however, a period of 6–60 hours is generally satisfactory. If desired, an inert solvent such as benzene, toluene, chloroform, dichloromethane, N,N-dimethylformamide, dioxane or tetrahydrofuran may be employed as diluent. In applying this method to the oxidation of alcohols particularly reactive to acid anhydrides it is preferable to employ a large excess of sulfoxide and a 2–5 mole excess of acid anhydride. After the reaction is completed the product is isolated in accordance with methods known in the art. For example, the product may be recovered by pouring the reaction mixture onto ice and filtering off the precipitated product. Alternately the reaction mixture may be poured onto ice and, after standing, made basic in the cold with a base such as ammonium hydroxide or aqueous sodium hydroxide. The product is then either filtered off or extracted from the mixture with a water immiscible solvent. When extracted into a solvent the product is obtained by evaporation of the solvent extracts and may be purified by the usual techniques. To facilitate the work-up of certain compounds it is preferable to add ethanol to the reaction mixture after completion of the oxidation. The mixture is then made basic and diluted with water and the product filtered off or extracted with a water immiscible solvent.

The dimethyl sulfoxide-acetic anhydride mixture is very valuable as an oxidizing agent since it is cheap and can be employed to prepare oxidized derivatives which are difficult to obtain by other methods. For example, yohimbine is oxidized smoothly to yohimbinone in excellent yield. Yohimbinone is of importance since it can be hydrolyzed to yohimban-17-one, a valuable alkaloid intermediate. In addition, ajmaline is converted to ajmalidine, and galanthamine to narwedine (galanthaminone); both are useful alkaloid intermediates. It is indeed novel to find that mixtures of acid anhydrides and dialkyl sulfoxides can be used to oxidize alcohols, for dialkyl sulfoxides such as dimethyl sulfoxide are known to react with anhydrides (Pummerer Reaction) to give alkylsulfides as exemplified below for acetic anhydride and dimethyl sulfoxide.

The invention will be described in greater detail in conjunction with the following specific examples.

*Example 1.—Oxidation of yohimbine to yohimbinone*

A mixture of 10.6 g. of yohimbine, 90 ml. of dry dimethyl sulfoxide and 60 ml. of acetic anhydride was stirred at room temperature under nitrogen for 18 hours. Ethanol (200 ml.) was then added to the reaction mixture. After being allowed to stand at 30° C. for 2.5 hours the mixture was diluted with 50 ml. of water and chilled by means of an ice bath. The mixture was made basic with concentrated ammonium hydroxide and diluted with 200 ml. of water while being chilled. After chilling for one hour, the mixture was filtered and the precipitate was washed twice with 200 ml. of water to yield 9.75 g. of yohimbinone as tan needles, M.P. 242–246° C. dec.

*Example 2.—Oxidation of yohimbine to yohimbinone*

A mixture of 10.6 g. of yohimbine, 90 ml. of dry dimethyl sulfoxide and 60 ml. of acetic anhydride was stirred at room temperature for 20 hours. The mixture was poured onto 350 g. of ice and made basic with 10 N sodium hydroxide. The mixture was filtered and the precipitate was washed with three 100 ml. portions of water. The dried solid was triturated with 100 ml. of ethanol and filtered to give 7.6 g. of yohimbinone, M.P. 245–250° C. dec.

*Example 3.—Oxidation of yohimbine to yohimbinone*

To a mixture of 11.7 g. of yohimbine hydrochloride in 90 ml. of dry dimethyl sulfoxide was added 3.34 g. of anhydrous potassium acetate. To this mixture was added 60 ml. of acetic anhydride and the mixture was stirred under nitrogen at room temperature for 21 hours. The mixture was diluted with 200 ml. of ethanol, chilled by means of an ice bath and made basic with concentrated ammonium hydroxide. The mixture was diluted with 200 ml. of water and filtered. The precipitate was washed twice with 250 ml. portions of water to give 8.73 g. of yohimbinone as tan crystals, M.P. 239–244° C. dec. Recrystallization from ethanol-chloroform gave the product as tan crystals, M.P. 250–252° C. dec.

*Example 4.—Oxidation of yohimbine to yohimbinone*

A mixture of 2.02 g. of yohimbine, 22.6 g. of benzoic anhydride and 20 ml. of dry dimethyl sulfoxide was allowed to stand at room temperature for 22 hours. The mixture was diluted with 10 ml. of water and 50 ml. of ethanol and allowed to stand 30 minutes. The mixture was chilled by means of an ice bath and made basic with concentrated ammonium hydroxide. After diluting with 75 ml. of water, the solid was collected by filtration and washed with water and with ether to give 1.73 g. of yohimbinone as light tan needles, M.P. 253–256° C. dec.

*Example 5.—Oxidation of yohimbine to yohimbinone*

A mixture of 0.708 g. of yohimbine, 10 ml. of tetramethylene sulfoxide and 4 ml. of acetic anhydride was allowed to stand at room temperature for 21 hours. The solution was poured into 20 ml. of ethanol, chilled and made basic with concentrated ammonium hydroxide. The mixture was diluted with 25 ml. of water and filtered to give 0.57 g. of yohimbinone as tan crystals, M.P. 250–253° C. dec.

*Example 6.—Oxidation of yohimbine to yohimbinone*

A mixture of 1.8 g. of polyphosphoric acid, 0.708 g. of yohimbine and 6 ml. of dry dimethyl sulfoxide was warmed on a steam bath until the solid dissolved and the solution was stirred at room temperature for 41 hours. The resulting solution was diluted with 25 ml. of ethanol and 5 ml. of water, chilled and made basic with concentrated ammonium hydroxide. The chilled mixture was diluted with 30 ml. of water, filtered and the precipitate was washed twice with 25 ml. portions of water. The solid was then washed with ether to give 0.36 g. of yohimbinone as tan crystals, M.P. 239–243° C. dec. Recrystallization from ethanol-chloroform gave the product as tan crystals, M.P. 250–253° C. dec.

*Example 7.—Oxidation of yohimbine to yohimbinone*

A mixture of 1.06 g. of yohimbine, 10 ml. of dry dimethyl sulfoxide and 0.425 g. of phosphorus pentoxide was heated under an atmosphere of nitrogen at 65° C. for 18 hours. The mixture was poured onto ice and was made basic with concentrated ammonium hydroxide. Filtration gave a solid which was dissolved in chloroform-ethanol (3:2) and filtered through synthetic magnesia silica gel. The filter cake was washed with chloroform-ethanol (9:1) and the filtrate was concentrated under reduced pressure. The residue was triturated with ethanol and filtered and the precipitate was washed with ether to give 0.48 g. of yohimbinone, M.P. 240–243° C. dec.

*Example 8.—Oxidation of α-yohimbine to methyl 17-oxoalloyohimban-16β-carboxylate*

A mixture of 2.12 g. of α-yohimbine, 25 ml. of dry dimethyl sulfoxide and 4.0 ml. of acetic anhydride was stirred at room temperature for 21 hours. The mixture was poured onto 60 g. of ice and 10 ml. of water and made basic with concentrated ammonium hydroxide. The solid which separated was removed by filtration and washed with water. After drying the solid was dissolved in ether and filtered through 10 g. of synthetic magnesia silica gel. The filter cake was washed with ether and the combined filtrates were concentrated under reduced pressure to give 2.10 g. of pale orange glass. Chromatography of the glass over 200 g. of silica gel gave, on elution with chloroform-ethanol (99.5:0.5) and evaporation of the eluate, methyl 17-oxoalloyohimban-16β-carboxylate as tan crystals, M.P. 176–179° C. dec.

*Example 9.—Oxidation of α-yohimbine to methyl 17-oxoalloyohimban-16β-carboxylate*

A mixture of 2.12 g. of α-yohimbine, 18 ml. of dry dimethyl sulfoxide and 12 ml. of acetic anhydride was allowed to stand at room temperature for 20 hours. The solution was diluted with 25 ml. of ethanol and concentrated under reduced pressure. Addition of ethanol and concentration under reduced pressure was repeated three times. The residual solution was poured onto 60 g. of ice and made basic with concentrated ammonium hydroxide. The solid which separated was removed by filtration and washed thoroughly with water to give 2.47 g. of a tan solid. The solid was dissolved in 25 ml. of ether and filtered through 10 g. of synthetic magnesia silica gel. The filter cake was washed with 75 ml. of ether and with 100 ml. of dichloromethane and the combined filtrates were concentrated under reduced pressure to give 2.0 g. of a glass. Purification by chromatography over silica gel gave methyl 17-oxoalloyohimban-16β-carboxylate as tan crystals, M.P. 179–182° C.

*Example 10.—Oxidation of methyl reserpate to methyl ketoreserpate*

A mixture of 8.29 g. of methyl reserpate, 60 ml. of dry dimethyl sulfoxide and 40 ml. of acetic anhydride was stirred at room temperature for 20 hours. The mixture was poured onto 350 g. of ice and made basic with 10 N sodium hydroxide. The mixture was extracted with 250 ml. of dichloromethane and with two 100 ml. portions of dichloromethane. The combined dichloromethane extracts were washed with water, dried over magnesium sulfate and concentrated under reduced pressure. The residue was suspended in ethanol and concentrated nearly to dryness. The residue was triturated with ether and hot ethanol and filtered to give 1.81 g. of methyl ketoreserpate, M.P. 229–231° C. dec.

*Example 11.—Oxidation of β-yohimbine to yohimbinone*

A mixture of 5.30 g. of β-yohimbine, 45 ml. of dry dimethyl sulfoxide and 30 ml. of acetic anhydride was allowed to stand at room temperature for 19.5 hours under an atmosphere of nitrogen. The solution was diluted with 100 ml. of ethanol and 10 ml. of water and chilled. The mixture was made basic with concentrated amomnium hydroxide and diluted with 125 ml. of water. The chilled mixture was filtered and the precipitate was washed with water to give 4.35 g. of tan crystals. Chromatography of the product over silica gel gave, on elution with chloroform-methanol (99.5–0.5), yohimbinone, M.P. 255–258° C. dec.

*Example 12.—Oxidation of ajmaline to ajmalidine*

A mixture of 7.17 g. of ajmaline, 60 ml. of dry dimethyl sulfoxide and 40 ml. of acetic anhydride was allowed to stand at room temperature for 18 hours. The solution was poured onto 250 g. of ice and the chilled mixture was made basic with concentrated ammonium hydroxide and extracted with dichloromethane. The extract was washed with water, dried over magnesium sulfate and concentrated under reduced pressure to give a gum. The gum was dissolved in 50 ml. of hot ethanol and the solution was diluted with 10 ml. of water and 2.5 ml. of 10 N sodium hydroxide. The solution was heated on a steam bath for 45 minutes and the solvent was then removed under reduced pressure. Ethanol was added and the solvent again removed. The residue was triturated with water and filtered to give 6.1 g. of solid. Chromatography of the solid over silica gel with chloroform-methanol (98:2) as eluent gave 3.4 g. of ajmalidine as a colorless glass which was crystallized from acetone to give colorless crystals, M.P. 240–243° C.

*Example 13.—Oxidation of testosterone to $\Delta^4$-androstene-3,17-dione*

To a solution of 1.15 g. of testosterone in 12 ml. of dry dimethyl sulfoxide was added 8 ml. of acetic anhydride. The solution was stirred for 13 hours at room temperature and poured onto 125 g. of ice. The mixture was made basic with 10 N sodium hydroxide and the resulting precipitate was removed by filtration and washed thoroughly with water to give 1.10 g. of white crystals. Recrystallization from ether gave 0.70 g. of $\Delta^4$-androstene-3,17-dione, M.P. 160–162° C. Concentration of the mother liquors gave 0.25 g. of crystals which were partitioned on a column of 640 g. of diatomaceous earth. (Stationary phase: 2-methoxyethanol saturated with heptane.) The column was developed with heptane and the fraction which was collected at 3.8 to 5.8 hold back volumes gave, on evaporation, 0.060 g. of $\Delta^4$-androstene-3,17-dione, M.P. 168–170° C.

*Example 14.—Oxidation of testosterone to $\Delta^4$-androstene-3,17-dione*

A mixture of 1.15 g. of testosterone, 7 ml. of dry dimethyl sulfoxide, 4 ml. of acetic anhydride and 5 ml. of dry N,N-dimethylformamide was allowed to stand at room temperature for 7 days. The solution was poured onto 75 g. of ice and the mixture was made basic with concentrated ammonium hydroxide. After being allowed to stand for 1 hour, the mixture was diluted with 25 ml. of water and filtered to give 1.1 g. of white crystals. Purification gave $\Delta^4$-androstene-3,17-dione, M.P. 168–170° C.

*Example 15.—Oxidation of p-nitrobenzyl alcohol to p-nitrobenzaldehyde*

A mixture of 1.53 g. of p-nitrobenzyl alcohol, 30 ml. of dry dimethyl sulfoxide and 10 ml. of acetic anhydride was allowed to stand at room temperature for 20 hours. The solution was poured onto 75 g. of ice and allowed to stand for 1 hour. The chilled mixture was made basic with cold 10 N sodium hydroxide and extracted with ether. The ether extract was washed with water, dried over magnesium sulfate and concentrated under reduced pressure. The residue was triturated with ether and filtered and the precipitate was recrystallized from ether to give 0.47 g. of p-nitrobenzaldehyde as pale yellow crystals, M.P. 102–103° C.

*Example 16.—Oxidation of hydrocortisone 21-acetate (21-acetoxy-11β,17-dihydroxypregn-4-ene-3,20-dione) to cortisone 21-acetate (21-acetoxy-17-hydroxypregn-4-ene-3,11,20-trione)*

A mixture of 0.404 g. of hydrocortisone 21-acetate, 3 ml. of dry dimethyl sulfoxide and 2 ml. of acetic anhydride was allowed to stand at room temperature for 56 hours. The mixture was poured into a mixture of 50 g. of ice and 10 ml. of water. The resulting gummy precipitate was triturated while the pH of the mixture was adjusted to 7 by addition of concentrated ammonium hydroxide. Filtration gave 0.400 g. of white crystals. Recrystallization from acetone gave 0.15 g. of cortisone 21-acetate (21-acetoxy-17-hydroxypregn-4-ene-3,11,20-trione), M.P. 237–239° C.

*Example 17.—Oxidation of (−)-galanthamine to narwedine*

A mixture of 1.00 g. of (−)-galanthamine, 10.5 ml. of dimethyl sulfoxide and 6.98 ml. of acetic anhydride was stirred at room temperature for 18 hours. The solution was poured into 200 ml. of ice-water and made alkaline with concentrated ammonium hydroxide. The mixture was extracted with dichloromethane and the extract washed with water, dried over magnesium sulfate and concentrated under reduced pressure. Trituration of the residual yellow gum with anhydrous ether gave 0.38 g. of narwedine as a yellow solid, M.P. 167–180° C. dec. Recrystallization from acetone gave colorless crystals, M.P. 188° C.

*Example 18.—Oxidation of 11α-hydroxyprogesterone to 11-ketoprogesterone*

A mixture of 0.330 g. of 11α-hydroxyprogesterone, 3 ml. of dry dimethyl sulfoxide and 2 ml. of acetic anhydride was allowed to stand at room temperature for 25 hours. The solution was poured onto a mixture of 20 g. of ice and 10 ml. of water. The mixture was made basic with concentrated ammonium hydroxide and diluted with 25 ml. of water. The mixture was extracted with chloroform, the extracts dried over magnesium sulfate and concentrated to give 300 mg. of a gum. This material was chomatographed on a column of 440 g. of diatomaceous earth with a holdback volume (HBV) of 600 ml., using heptane saturated with methanol as solvent. The fraction collected from 6–7.6 HBV was concentrated under reduced pressure to yield 0.100 g. of product. Crystallization from acetone-petroleum ether (B.P. 30–60° C.) gave 11-ketoprogesterone as colorless crystals, M.P. 171–172° C.

*Example 19.—Oxidation of 2′,3′-isopropylideneadenosine to 2′,3′-isopropylideneadenosine-5′-aldehyde*

A mixture of 0.307 g. of 2′,3′-isopropylideneadenosine, 3 ml. of dry dimethyl sulfoxide and 1 ml. of acetic anhydride was allowed to stand at room temperature for 23 hours. The solution was poured onto 15 g. of ice and aqueous sodium bicarbonate was added to keep the pH near 7. The mixture was diluted with 60 ml. of water and the gum which separated was triturated with water and filtered to give a pale yellow solid. Filtration gave 0.230 g. of 2′,3′-isopropylideneadenosine-5′-aldehyde, as a yellow amorphous product. Hydrolysis with aqueous acetic acid gave adenosine-5′-aldehyde.

What is claimed is:

1. In the process of oxidizing an alcohol having at least one hydrogen atom attached to the carbon atom bearing the hydroxyl substituent to the corresponding carbonyl compound, the improvement which comprises intimately contacting said alcohol with a mixture of dialkyl sulfoxide and an acid anhydride selected from the group consisting of carboxylic acid anhydrides and phosphoric anhydrides, and recovering the carbonyl compound from the resulting reaction mixture.

2. In the process of oxidizing an alcohol having at least one hydrogen atom attached to the carbon atom bearing the hydroxyl substituent to the corresponding carbonyl compound, the improvement which comprises intimately contacting said alcohol with a mixture of dimethyl sulfoxide and acetic anhydride, and recovering the carbonyl compound from the resulting reaction mixture.

3. In the process of oxidizing an alcohol having at least one hydrogen atom attached to the carbon atom bearing the hydroxyl substituent to the corresponding carbonyl compound, the improvement which comprises intimately contacting said alcohol with a mixture of dimethyl sulfoxide and polyphosphoric acid, and recovering the carbonyl compound from the resulting reaction mixture.

4. A process for preparing yohimbinone which comprises intimately contacting yohimbine with a mixture of dimethyl sulfoxide and acetic anhydride and recovering yohimbinone from the resulting reaction mixture.

5. A process for preparing yohimbinone which comprises intimately contacting yohimbine with a mixture of dimethyl sulfoxide and benzoic anhydride and recovering yohimbinone from the resulting reaction mixture.

6. A process for preparing yohimbinone which comprises intimately contacting yohimbine with a mixture of dimethyl sulfoxide and polyphosphoric acid and recovering yohimbinone from the resulting reaction mixture.

7. A process for preparing yohimbinone which comprises intimately contacting yohimbine with a mixture of dimethyl sulfoxide and phosphorus pentoxide and recovering yohimbinone from the resulting reaction mixture.

8. A process for preparing yohimbinone which comprises intimately contacting yohimbine with a mixture of tetramethylene sulfoxide and acetic anhydride and recovering yohimbinone from the resulting reaction mixture.

9. A process for preparing yohimbinone which comprises intimately contacting yohimbine with a mixture of tetramethylene sulfoxide and phosphorus pentoxide and recovering yohimbinone from the resulting reaction mixture.

10. A process for preparing yohimbinone which comprises intimately contacting β-yohimbine with a mixture of dimethyl sulfoxide and acetic anhydride and recovering yohimbinone from the resulting reaction mixture.

11. A process for preparing yohimbinone which comprises intimately contacting β-yohimbine with a mixture of dimethyl sulfoxide and phosphorus pentoxide and recovering yohimbinone from the resulting reaction mixture.

12. A process for preparing methyl 17-oxoalloyohimban-16β-carboxylate which comprises intimately contacting α-yohimbine with a mixture of dimethyl sulfoxide and acetic anhydride and recovering methyl 17-oxoalloyohimban-16β-carboxylate from the resulting reaction mixture.

13. A process for preparing methyl ketoreserpate which comprises intimately contacting methyl reserpate with a mixture of dimethyl sulfoxide and acetic anhydride and recovering methyl ketoreserpate from the resulting reaction mixture.

14. A process for preparing ajmalidine which comprises intimately contacting ajmaline with a mixture of dimethyl sulfoxide and acetic anhydride and recovering ajmalidine from the resulting reaction mixture.

15. A process for preparing narwedine which comprises intimately contacting galanthamine with a mixture of dimethyl sulfoxide and acetic anhydride and recovering narwedine from the resulting reaction mixture.

16. A process for preparing cortisone 21-acetate which comprises intimately contacting hydrocortisone 21-acetate with a mixture of dimethyl sulfoxide and acetic anhydride and recovering cortisone 21-acetate from the resulting reaction mixture.

17. A process for preparing 11-ketoprogesterone which comprises intimately contacting 11α-hydroxyprogesterone with a mixture of dimethyl sulfoxide and acetic anhydride and recovering 11-ketoprogesterone from the resulting reaction mixture.

18. A process for preparing dihydrocodeinone which comprises intimately contacting dihydrocodeine with a mixture of dimethyl sulfoxide and acetic anhydride and recovering dihydrocodeinone from the resulting reaction mixture.

19. A process for preparing 3-methoxy-6-oxo-14-hydroxy-N-methylmorphinan which comprises intimately contacting 3-methoxy-6β-14-dihydroxy - N - methylmorphinan with a mixture of dimethyl sulfoxide and acetic anhydride and recovering 3-methoxy-6-oxo-14-hydroxy-N-methylmorphinan from the resulting reaction mixture.

20. A process for preparing thujone which comprises intimately contacting thujyl alcohol with a mixture of dimethyl sulfoxide and acetic anhydride and recovering thujone from the resulting reaction mixture.

References Cited

Albright et al.: Jour. Amer. Chem. Soc., vol. 87, No. 18, pp. 4214–6.

JAMES A. PATTEN, *Primary Examiner.*